United States Patent [19]

Wang et al.

[11] Patent Number: 5,365,520
[45] Date of Patent: Nov. 15, 1994

[54] DYNAMIC SIGNAL ROUTING

[75] Inventors: Theresa C. Y. Wang, Scottsdale, Ariz.; Raymond J. Leopold, Colorado Springs, Colo.

[73] Assignee: Motorola, Inc., Schaumburg, Ill.

[21] Appl. No.: 858,829

[22] Filed: Mar. 27, 1992

[51] Int. Cl.⁵ ............................................. H04L 12/56
[52] U.S. Cl. ............................................. 370/60
[58] Field of Search ............... 370/60, 94.1, 94.2, 370/94.3, 93, 58.1, 58.2, 54, 16; 340/825.02, 827; 379/221

[56] References Cited

U.S. PATENT DOCUMENTS

| | | | |
|---|---|---|---|
| 4,009,345 | 2/1977 | Flemming et al. | 370/93 |
| 4,491,947 | 1/1985 | Frank | 370/94.2 |
| 4,669,113 | 5/1987 | Ash et al. | 379/221 |
| 5,018,133 | 5/1991 | Tsukakoshi et al. | 370/94.1 |
| 5,042,027 | 8/1991 | Takase et al. | 370/60 |
| 5,095,480 | 3/1992 | Fenner | 370/94.1 |
| 5,179,556 | 1/1993 | Turner | 370/84 |
| 5,179,558 | 1/1993 | Thacker et al. | 370/94.3 |

Primary Examiner—Douglas W. Olms
Assistant Examiner—Dang Ton
Attorney, Agent, or Firm—Gregory J. Gorrie; Robert M. Handy

[57] ABSTRACT

Data packets are delivered through a constellation of nodes to a termination unit. The node where a packet leaves the constellation is a terminal node. Each packet includes a routing code. When a node receives a packet, it examines the routing code to determine if that node might be the packet's terminal node. A table look up operation is performed using the routing code as an index to a routing table. The table identifies a link to use in routing the packet away from the node to a neighbor node. The packet is also examined to verify compatibility between packet type and a selected link. If an incompatibility exists, a substitute link is selected. When a node concludes that it might be a terminal node for a packet, it evaluates a channel identifier to determine if it is currently serving the party to whom the packet is directed.

27 Claims, 7 Drawing Sheets

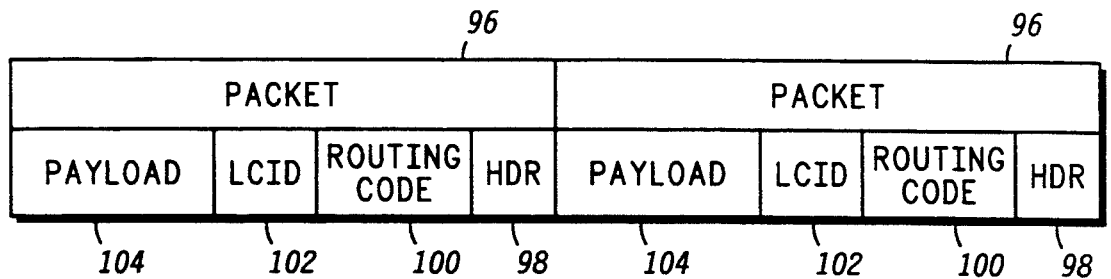
FIG. 6
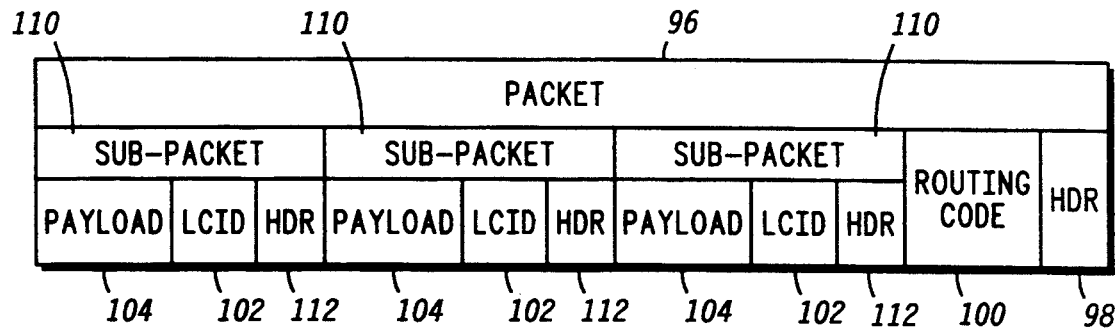
FIG. 7
FIG. 8
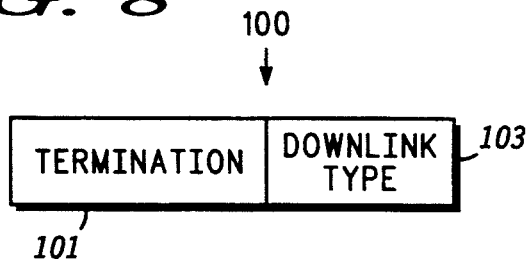
FIG. 9
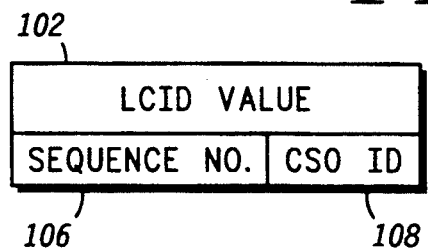

DYNAMIC SIGNAL ROUTING

TECHNICAL FIELD OF THE INVENTION

The present invention relates generally to communication networks. More specifically, the present invention relates to selecting paths for delivering communications through a network of switching nodes.

BACKGROUND OF THE INVENTION

Communication networks, such as those used to deliver telecommunications, to interconnect computers, and the like, may include any number of nodes. The networks may deliver electronic communications between two points by routing the communications from node to node within the network. As the number of nodes in a network increases and as the number of communication paths available to each network node increases, the number of potential paths available for delivering any single communication likewise increases. Accordingly, the problem of selecting an appropriate path through the network arises. Typically, a network attempts to select the shortest possible path to minimize delay, consume a minimal amount of network resources, and to maximize reliability in delivering a communication. At the same time, a network needs to balance this concern with a need to prevent communication traffic bottlenecks and a need to achieve the highest possible probability that a communication will be delivered to its intended destination.

Conventionally, a static communication delivery path through a network is established prior to the actual delivery of a communication. In other words, a static delivery path is cleared during a call setup mode, which takes place before communications commence. A certain amount of network resources are dedicated to clearing the static path during call setup. However, once the static path has been cleared it remains allocated to the upcoming call until the call terminates.

While this conventional static signal routing technique adequately serves the needs of a static environment, it fails to meet the needs of a dynamic environment. In particular, when the network delivers communications between two points that move relative to the network, a dynamic path definition is needed to compensate for movement. For example, the physical assets, or switching nodes, which are advantageous choices in routing signals between two points at call setup become disadvantageous choices as the call progresses due to movement.

SUMMARY OF THE INVENTION

Accordingly, it is an advantage of the present invention that a network is provided which dynamically routes communication signals.

Another advantage of the present invention is that network resources dedicated to routing communication signals are minimized.

Another advantage is that the present invention distributes routing decisions among network nodes.

Another advantage is that the present invention minimizes delay in delivering communication signals between network entry and exit points.

Another advantage is that the present invention compensates for communication traffic congestion.

The above and other advantages of the present invention are carried out in one form by a method of routing a signal through a switch which serves as one node in a constellation of switching nodes. The method calls for receiving a data packet having a routing code therein. The data packet represents at least a portion of the signal being routed. A link identifier is obtained in response to the routing code included in the data packet. This link identifier specifies one of a plurality of communication links useable at the switch in routing the data packet away from the switch. The data packet is then transmitted away from the switch over this one communication link.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 6 shows a data format diagram used in a first embodiment of the present invention to communicate data;

FIG. 7 shows a data format diagram used in a second embodiment of the present invention to communicate data;

FIG. 8 shows a data format diagram used to convey a routing code;

FIG. 9 shows a data format diagram used to convey a logical channel identification (LCID) value.

DETAILED DESCRIPTION OF THE PREFERRED EMBODIMENTS

Figure 1:
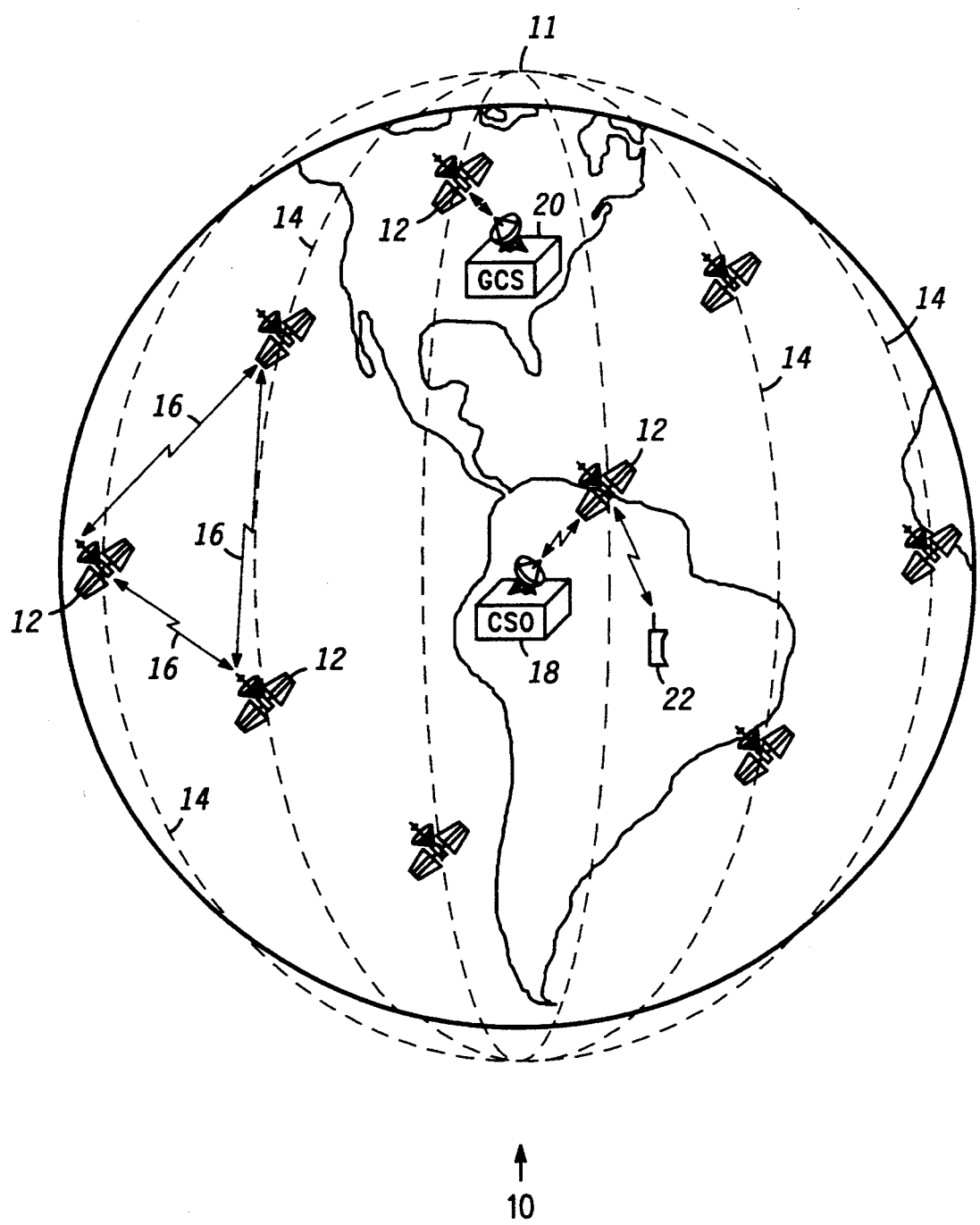
FIG. 1 shows a layout diagram of an environment within which an embodiment of the present invention is practiced.

FIG. 1 illustrates a satellite-based communication network 10. Network 10 includes a constellation 11 of switching nodes 12 that are dispersed around the earth. In the preferred embodiment, nodes 12 are orbiting satellites. Satellites 12 occupy polar, low-earth orbits 14. In particular, the preferred embodiment of network 10 uses six polar orbits, with each orbit holding eleven satellites 12. For clarity, FIG. 1 illustrates only a few of these satellites 12.

Orbits 14 and satellites 12 are distributed around the earth. Each orbit 14 encircles the earth at an altitude of around 765 km. Due to these low-earth orbits 14, satellites 12 travel with respect to the earth at around 25,000 km/hr and complete an orbit in around 100 minutes. Together, satellites 12 remain relatively stationary within constellation 11 with respect to one another, except for their orbits converging and crossing over each other in the polar regions.

Figure 2:
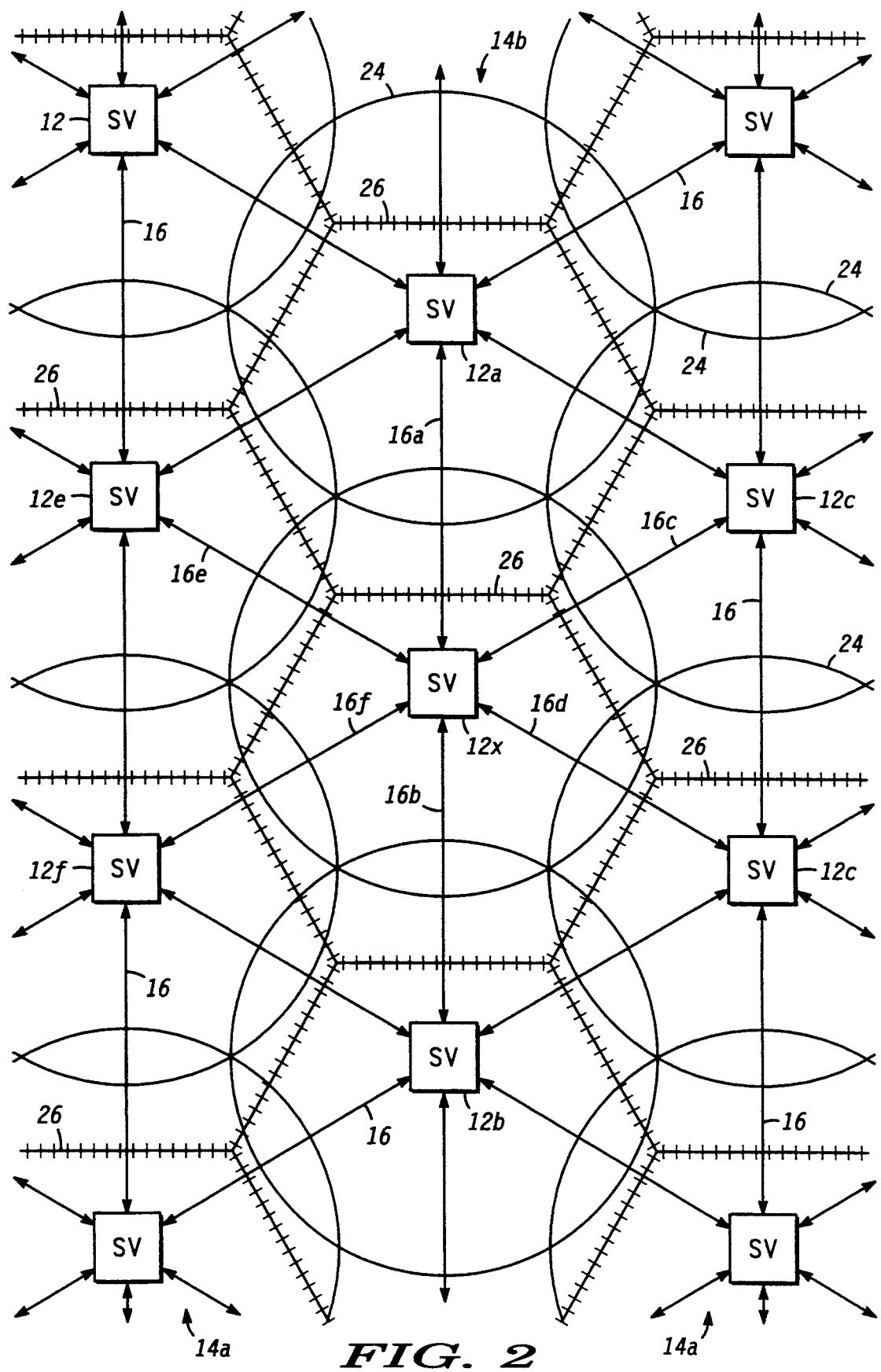
FIG. 2 shows a layout diagram of switching nodes in a communication network, jurisdictions corresponding to the switching nodes, and communication links between the switching nodes.

FIG. 2 presents an exemplary static, two dimensional "snap-shot" map of the relative orientation of a few of satellites (SVs) 12. With reference to FIGS. 1–2, at any given instant satellites 12 in even orbital planes 14a typically reside at approximately the same latitudes. Likewise, satellites 12 typically reside at approximately the same latitudes for all odd planes 14b. However, odd-plane satellites 12 are positioned out-of-phase with even-plane satellites 12. At any given instant, the latitudes of odd-plane satellites 12 are approximately half way between the latitudes for nearby even-plane satellites 12.

A line-of-sight exists between each satellite 12 and fore and aft satellites 12 in the same plane 14 and between fore and aft satellites 12 in adjacent planes. With reference to FIG. 1, a line-of-sight also exists between satellites in non-adjacent orbital planes 14 as the orbits converge near the polar regions. The preferred embodiment employs RF communications, preferably in the 20–30 GHz range, to establish communication links 16 between each satellite 12 and its "neighbor" satellites 12. Links 16 are referred to as cross links herein to distinguish them from the links used by signals for entry into and exit from constellation 11. With reference to FIG. 2, up to six line-of-sight, bi-directional, RF communication cross links 16 are supported for each satellite 12. Fore and aft cross links 16a and 16b exist between a satellite 12x and the preceding and following satellites 12a and 12b, respectively, orbiting in the same plane 14 (i.e. in-plane satellites). Fore-right and aft-right cross links 16c and 16d exist between satellite 12x and the preceding and following satellites 12c and 12d, respectively, orbiting in a right side adjacent plane 14 (i.e. cross-plane satellites). Likewise, fore-left and aft-left cross links 16e and 16f exist between satellite 12x and the preceding and following satellites 12e and 12f, respectively, orbiting in a left side adjacent plane 14.

For purposes of the present invention, satellites 12a–12f are referred to as neighbor satellites to satellite 12x. In particular, neighbor satellites nodes are those constellation nodes to which messages may be sent and from which messages may be received without requiring the messages to pass through any other node. This definition includes nodes which may not be in adjacent orbital planes but which nevertheless are within a line-of-sight due to the convergence of orbital planes 14 in the polar regions. In the embodiment of the present invention depicted in FIGS. 1–2, communications may be delivered only to neighbor nodes. Each satellite 12 supports a similar set of cross links 16 and neighbor nodes.

While FIGS. 1–2 and the above-presented discussion describe a preferred orbital geometry for network 10, those skilled in the art will appreciate that the switching node which each satellite 12 provides need not be positioned as described herein. For example, such nodes may be located on the surface of the earth or in orbits other than those described herein. Likewise, the precise number of switching nodes may vary from network to network, the number of cross links 16 supported by each node may vary from network to network, and the population of switching nodes with which each node may directly communicate need not be limited to nodes physically nearby.

With reference back to FIG. 1, satellites 12 communicate with devices on the ground through many central switching offices (CSOs) 18, of which FIG. 1 shows only one, a few ground control stations (GCSs) 20, of which FIG. 1 shows only one, and any number, potentially in the millions, of radio communication subscriber units 22, of which one is shown in FIG. 1. Subscriber units 22 may be located anywhere on the face of the earth. CSOs 18 are preferably distributed over the surface of the earth in accordance with geo-political boundaries. In the preferred embodiment, each satellite 12 may communicate with up to four CSOs 18 and over a thousand subscriber units 22 at any given instant. GCSs 20 preferably reside in the northern or southern latitudes, where the convergence of orbits 14 causes a greater number of satellites 12 to come within direct line-of-sight view of a single point on the surface of the earth with respect to more equatorial latitudes. Preferably, around two to four GCSs 20 are used so that all satellites 12 in the constellation may at some point in their orbits 14 come within direct view of their assigned GCS 20.

Nothing prevents CSOs 18 and GCSs 20 from being located together on the ground. However, CSOs 18 serve a different function from that of GCSs 20. GCSs 20 preferably perform telemetry, tracking, and control (TT&C) functions for the constellation of satellites 12.

Preferably, CSOs 18 operate as communication nodes in network 10. Diverse terrestrial-based communications systems, such as national public switched telecommunications networks (not shown), may access network 10 through CSOs 18. Due to the configuration of the constellation of satellites 12, at least one of satellites 12 is within view of each point on the surface of the earth at all times.

For purposes of the present invention, each end of a communication may be viewed as having a terminal node. The role of a terminal node is played by the one satellite 12 in constellation 11 that routes the communication away from constellation 11 toward the earth. The terminal node may deliver a communication to a CSO 18, a GCS 20, or a subscriber unit 22.

Accordingly, network 10 may establish a bi-directional communication circuit or two unidirectional circuits through constellation 11 of satellites 12 between any two subscriber units 22, between any subscriber unit 22 and any CSO 18, or between any two CSOs 18. However, these communication circuits use different nodes of constellation 11 from moment to moment for delivering communications. The nodes change in response to the movement of constellation 11 with respect to the earth.

In addition to the above-discussed relationship between satellites 12 and cross links 16, FIG. 2 shows two jurisdictional patterns related to satellites 12. FIG. 2 shows a pattern of circles 24 arranged so that each satellite 12 resides at the center of a circle 24, so that every point in FIG. 2 resides within at leash one of circles 24, and so that a minimal amount of overlap between circles 24 results. Circles 24 roughly indicate lines of equal signal strength for RF communications broadcast to the surface of the earth from each corresponding satellite 12. Accordingly, circles 24 roughly define the geographical jurisdiction on the earth of each satellite 12. In other words, a CSO 18, GCS 20, or subscriber unit 22 may communicate with a satellite 12 within whose jurisdiction it resides. Since satellites 12 move relative to the earth, circles 24 likewise move. Those skilled in the art will appreciate that nothing prevents the division of circles 24 into smaller cellular patterns to improve the geographical reuse of the frequency spectrum allocated to each satellite 12. Moreover, those skilled in the art will recognize that the boundaries indicated by circles 24 are not defined with precision in actuality.

FIG. 2 additionally shows a pattern of space regions 26. Each space region 26 is represented by a unique static hexagon. Regions 26 are static because they do not move with respect to the earth. Thus, satellites 12 and circles 24 enter and exit regions 26 due to the movement of satellites 12. FIG. 2 illustrates space regions 26 as equal size hexagons having a diameter approximately equal to the diameter of circles 24. Thus, no significant overlap occurs between regions 26, and regions 26 collectively cover the entire surface of the earth. However, those skilled in the art will appreciate that any number of regions 26 may be defined, that other shapes may be adopted, that all regions 26 need not have the same shape or size, and that no set geometric relationship needs to exist between regions 26 and circles 24. For example, space regions 26 and circles may both become reduced in size near the polar regions to compensate for the convergence of the orbits.

In the preferred embodiment of the present invention, approximately 66 space regions 26 are defined. Although this number achieves a desirable one-to-one correspondence to the number of satellites 12 in the preferred embodiment of the present invention, it is not a critical feature. On the other hand, a unique one of 66 possible space regions may be specified with a seven bit number, which is a relatively small amount of data to use in communicating world-wide geographic data. Moreover, with 66 space regions approximately the same size as circles 24, each space region 26 fits within the collective jurisdiction of a particular one of satellites 12 and the neighbor satellites to this one satellite 12.

Circular patterns 24 and space regions 26 are useful because they illustrate two diverse routing embodiments contemplated by the present invention. In both embodiments, signals are encoded as digital data packets, and each packet includes a routing code. Moreover, this routing code is desirably communicated using a relatively small amount of data, such as seven or eight bits. For each call, constellation 11 (see FIG. 1) may deliver thousands of such data packets. Thus, the use of only a few routing bits in each data packet saves network resources compared to implementations that require more elaborate routing codes.

In one embodiment of the present invention, referred to below as a space region embodiment, the routing code identifies the space region 26 to which the data packets are directed. In this space region embodiment, all nodes 12 include sufficient intelligence to route data packets to a node 12 serving the identified space region 26. Once the data packet arrives at the indicated satellite or node 12, the data packets are passed on to the earth, either by this node 12 or by a neighbor node 12. The entities setting up a call and participating in the call need not be aware of the precise nodes 12 used in delivering data packets or of changes in the identities of these nodes 12 over the course of a call.

In another embodiment of the present invention, referred to below as a physical node embodiment, the routing code identifies a particular switching node or satellite 12 which serves as the terminal node for the data packets communicated by a call. In this physical node embodiment, all nodes 12 include sufficient intelligence to route the data packets to this terminal node. Since nodes 12 do not move significantly with respect to one another, only a minor amount of intelligence is required. On the other hand, as the terminal node changes over the course of a call, the change in identity of the terminal node is communicated back to the party originating the data packets. This physical node embodiment relies exclusively on the satellite jurisdiction indicated by circles 24 and does not use space regions 26.

Figure 3:
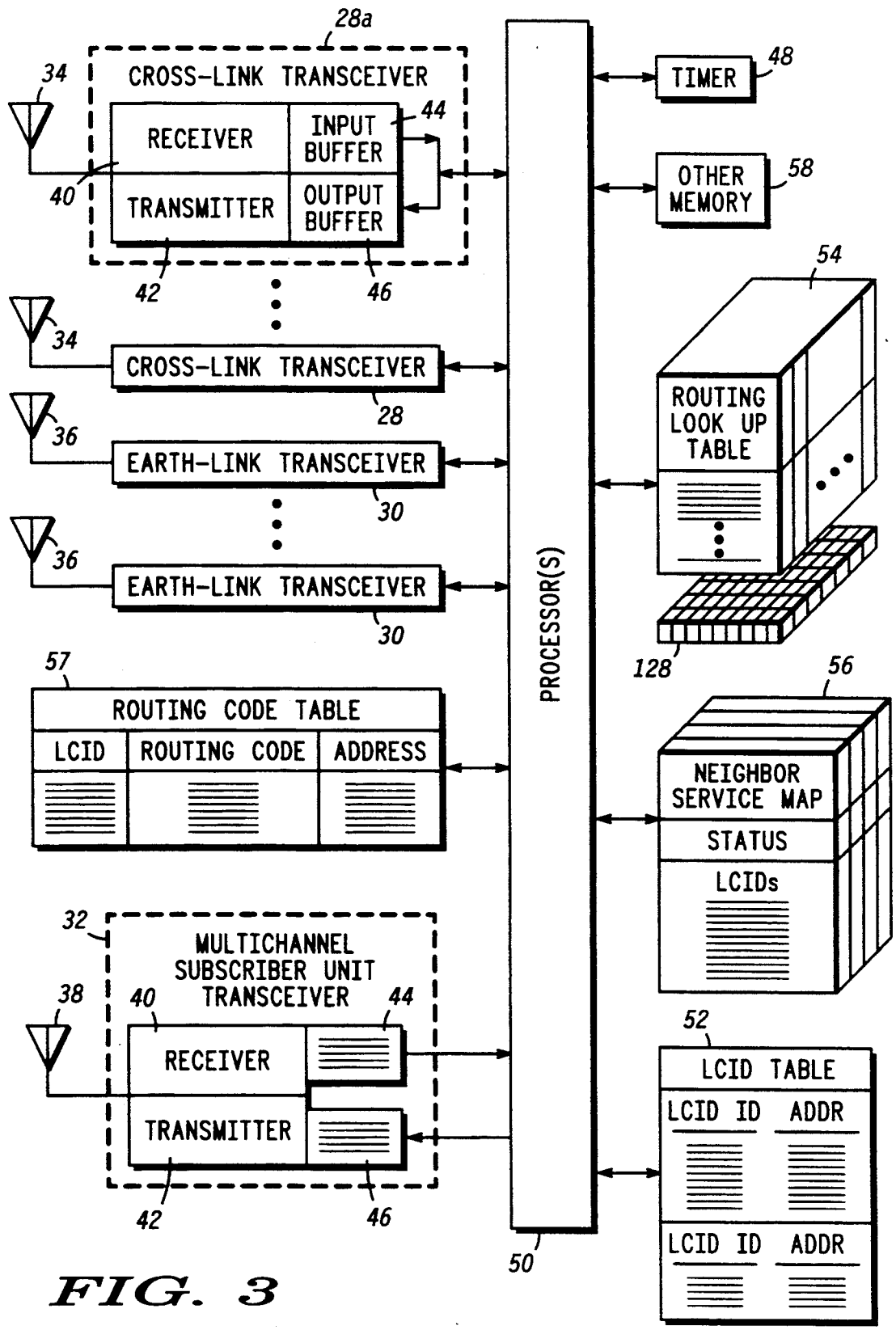
FIG. 3 shows a block diagram of a single switching node, or switch, of the communication network.

FIG. 3 shows a block diagram of a switching node, for example a satellite 12, used by constellation 11 (see FIG. 1). In the preferred embodiment of the present invention, all nodes 12 have a similar structure. Node 12 includes any number of transceivers. For example, one transceiver 28 may be included for each cross link 16 (see FIG. 2). In addition, node 12 may include any number of earth-link transceivers 30, where each earth-link transceiver 30 serves a single CSO 18 or GCS 20 (see FIG. 1). Node 12 may additionally include a subscriber-unit transceiver 32. Node 12 communicates with any number of subscriber units 22 (see FIG. 1), potentially in the thousands an any given instant, through transceiver 32. Each of transceivers 28-32 couples to corresponding antennas 34-38, respectively.

Each transceiver 28-32 may include various subcomponents common in the art, as illustrated in connection with cross-link transceiver 28a and subscriber unit transceiver 32. For example, each of transceivers 28-32 may include a receiver 40 and a transmitter 42. Each receiver 40 couples to an input buffer 44, into which input data are placed after the data are received at node 12 and demodulated. For subscriber transceiver 32, input buffer 44 may be divided so that an individual sub-buffer is provided for each of the numerous channels served by transceiver 32. Each transmitter 42 couples to an output buffer 46, from which data are obtained for modulation and radiation or broadcasting away from node 12. For subscriber transceiver 32 output buffer 46 may be divided so that an individual sub-buffer is provided for each of the numerous channels served by transceiver 32.

Transceivers 28-32, along with various memory components and a timer 48, couple to a processor 50. Processor 50 may be implemented using a single processor or multiple processors operated in a parallel architecture. Generally speaking, processor 50 coordinates and controls transceivers 28 so that node 12 receives data communications from cross links 16, appropriately distributes the received communications among output buffers 46, and transmits the communications back out into cross links 16. Data communications are also received from and transmitted to the surface of the earth via transceivers 30-32. Timer 48 is utilized to synchronize processor 50 and node 12 with timing constraints imposed by network 10 (see FIG. 1).

The memory components of node 12 are configured to include a logical channel identification (LCID) table 52. Table 52 associates LCID values, discussed below, with output buffer addresses of transceiver 32 in a one to one correspondence. The addresses included in table 52 directly correspond to a channel used to transmit communications to a subscriber unit 22. In other words, by writing data in the output buffer 46 of transceiver 32 at the location specified by an address in LCID table 52, a particular traffic channel assigned to a particular subscriber unit 22 is selected.

The memory components are further configured to include a routing look up table (RLUT) 54, a neighbor service map or list 56, a routing code table 57, and other memory 58. Generally speaking, RLUT 54 contains one data element for each possible routing code that may be received in a data packet at node 12. The data element associated with a data packet's routing code identifies which cross link 16 (see FIG. 2) to use in routing the data packet away from node 12 to its intended location. Alternatively, the data element may inform node 12 that the data packet has reached its intended destination.

Neighbor service map 56 records LCID values assigned to calls for which neighbor nodes 12 are new terminal nodes, status data characterizing the traffic carrying capacity of the cross links 16 to those nodes, and which CSOs 18 and GCSs 20 (see FIG. 1) being served by those nodes. New terminal nodes are nodes to which data packets have been handed in the physical node embodiment of the present invention. RLUT 54 and map 56 are discussed in more detail below.

Routing code table 57 associates LCID values, routing codes, and addresses of input buffer 44 for multi-channel transceiver 32 in a one-to-one correspondence. The addresses included in table 57 directly correspond to a particular channels used in up-linking data packets to node 12. Node 12 may append the LCID values and routing code to the data packets before transferring the packets to another entity in network 10. The routing code and LCID values are initially determined during call setup, preferably by a CSO 18 (see FIG. 1), and sent to node 12 in a network control message. In accordance with the physical node embodiment of the present invention, the routing code is repetitively updated during the course of a call in accordance with network control messages received from nodes handling opposing ends of the calls.

Other memory 58 includes data which serve as instructions to processor 50 and which, when executed by processor 50, cause node 12 to carry out procedures that are discussed below. Memory 58 also includes other variables, tables, and databases that are manipulated due to the operation of node 12.

Figure 4:
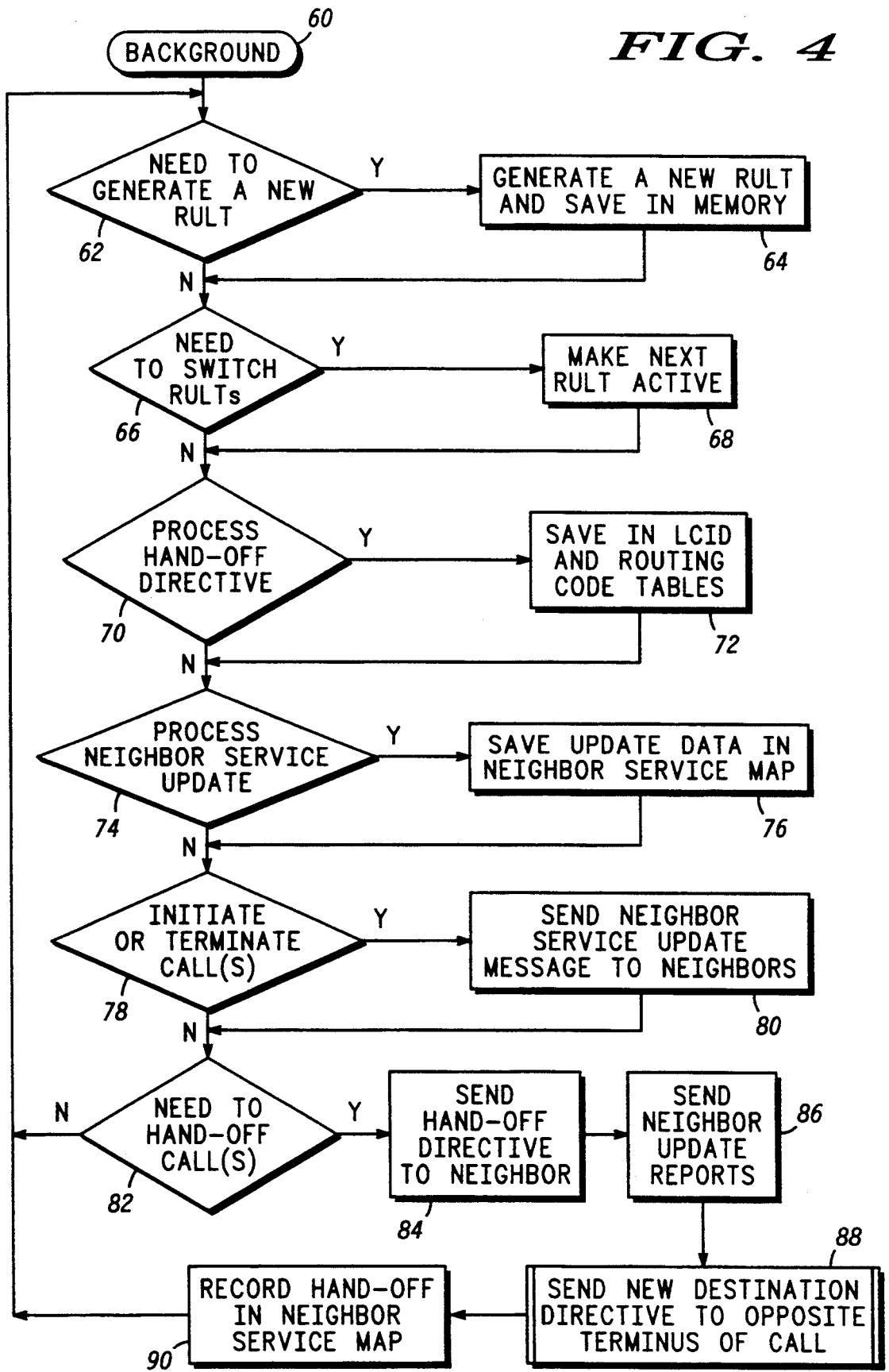
FIG. 4 shows a flow chart of a Background procedure performed by switching nodes of the communication network.

FIG. 4 shows a flow chart of a Background procedure 60, which is performed by node 12 to support the switching of data packets from any input buffer 44 to an appropriate output buffer 46 (see FIG. 3). In the preferred embodiment of the present invention, all nodes 12 perform substantially the same procedure. Background procedure 60 may be viewed as running continuously while nodes 12 simultaneously engage in other activities. Generally speaking, procedure 60 determines whether certain needs have arisen, then takes an appropriate action when the needs are detected.

The flow chart shown in FIG. 4 is constructed primarily from the perspective of the space region embodiment, discussed above, of the present invention. Many tasks depicted in FIG. 4 may be omitted for the physical node embodiment of the present invention. On the other hand, the few tasks which may be omitted for the space region embodiment are illustrated in FIG. 4 with double-lined boxes.

Procedure 60 performs a query task 62 to determine whether one or more new RLUTs 54 (see FIG. 3) need to be generated for use by node 12. The space region embodiment of the present invention utilizes different RLUTs 54 to track the movement of nodes 12 over space regions 26 (see FIG. 2). Accordingly, a number, for example 10-100, of different RLUTs 54 are used every orbit, and each orbit's set of RLUTs 54 differs from the set used in the previous orbit. Rather than consume an extensive amount of memory storing RLUTs 54 that are not being used, the present invention generates RLUTs 54 before they are needed. RLUTs 54 that are no longer needed may be overwritten in the memory of node 12. Accordingly, task 62 determines when a need for generating a new RLUT 54 exists.

The need to generate a new RLUT may be determined in accordance with a variety of factors. For example, task 62 may determine that a new RLUT 54 needs to be generated a predetermined period of time before the new table will be used by node 12. Alternatively, task 62 may queue the generation of a new RLUT 54 when a stockpile of existing RLUTs 54 falls below a predetermined size. Or, task 62 may decide that all RLUTs 54 to be used in an upcoming orbit need to be generated when a node is over a polar region of the earth where communication traffic is low and node 12 may easily spare processing power for the generation of RLUTs 54. These and other considerations pertinent to the efficient operation of node 12 may be relied upon in task 62 to determine when a need exists for generating one or more new RLUTs 54.

When task 62 detects the need for generating one or more RLUTs 54, a task 64 generates the one or more RLUTs 54 and saves them in the memory of node 12. Task 64 may be performed immediately after task 62, or may be performed later in a separate process which has been queued by task 62. Each single RLUT 54 associates a few bits of data with each possible space region 26 (see FIG. 2). The data saved in RLUT 54 represent a link identifier (ID). The link ID specifies which of cross links 16 (see FIG. 2) to use in routing a data packet to the space region identified by a routing code. Alternatively, the link ID may inform node 12 that the data packet might have reached its destination space region and that perhaps no cross link 16 should be used to transfer a data packet away from a node 12.

The precise algorithms used to generate RLUTs 54 are not critical to the operation of the present invention. For example, a node 12 may simulate the position of itself and its neighbor nodes in constellation 11 with respect to all space regions 26 (see FIG. 2) at a representative point in time for the RLUT 54 being generated. Then, node 12 may, for simulated data packets routed to all possible space regions, determine the shortest or most direct path from the simulated position. Alternatively, node 12 may receive data from a control station, such as GCS 20 (see FIG. 1), which can be expanded to generate one or more RLUTs 54. Furthermore, nothing prevents the generating algorithms from incorporating special case rules. For example, routing algorithms may be configured to slightly favor in-plane routing over cross-plane routing and even to weigh this bias toward favoring in-plane routing differently at polar latitudes when compared to more equatorial latitudes.

Background procedure 60 performs a task 66 to determine whether a need exists for switching from a currently used RLUT 54 to a new RLUT 54. Preferably, a single RLUT 54 is activated for a predetermined period of time, for example one to ten minutes. Task 66 may desirably determine when this predetermined period of time has expired. When task 66 detects the need to switch between RLUTs 54, a task 68 saves a variable in the memory of node 12 which causes the next scheduled RLUT 54 to become the activated RLUT 54.

For the space region embodiment of the present invention, an appropriate RLUT 54 is activated at regular intervals. RLUTs 54 are generated in advance and are ready and waiting to be activated when they are needed. A continuous stream of RLUTs 54 tracks the movement of node 12. Tasks 62–66 may, but need not, be omitted in connection with the physical node embodiment of the present invention. The physical node embodiment routes data packets to specified physical nodes 12. The relative orientation of nodes 12 remains static. Consequently, RLUT 54 may require only minor changes during normal operations in connection with the physical node embodiment of the present invention. In the physical node embodiment, RLUT 54 may, for example, be generated off-line and communicated to node 12 via a GCS 20 (see FIG. 1).

Background procedure 60 performs a task 70 to determine whether a need exists for processing a hand-off directive. A hand-off directive represents a message received from a neighbor node 12. The message informs a node 12 that the neighbor node sending the message has been a terminal node for one or more calls identified by the directive. As a terminal node, the neighbor node has been routing data packets associated with the one or more calls to one or more terminating units on or near the earth, such as subscriber units 22, CSOs 18, or the like. The hand-off directive also informs the node 12 receiving the directive that the neighbor node is moving out of range for the terminating units and that the node 12 receiving the directive will, at some nearby point in time, be serving as the terminal node for the one or more calls.

When task 70 detects a need for processing a hand-off directive, a task 72 takes an appropriate responsive action. Task 72 may be performed immediately after task 70 or later in a separate process which has been queued by task 70. When calls associated with subscriber units 22 (see FIG. 1) are being handed off, task 72 may store logical channel identification (LCID) values in LCID table 52 and in routing code table 57 (see FIG. 3). An LCID value is a tag which each data packet in a call carries to uniquely identify the call, to identify the subscriber unit 22 to which the data packet is directed, and to identify a CSO 18 (see FIG. 1) which has some connection with the call. LCID values are discussed in more detail below. By saving LCID values in LCID table 52 and call routing table 57, node 12 assigns channels to the LCID values.

When calls associated with CSOs 18 (see FIG. 1) are being handed off, task 72 may store the identity of the CSOs in neighbor service map 56. By saving these CSO IDs in map 56, node 12 can send the bulk messages to the new terminal node which will assign a particular earth-link transceiver 30 (see FIG. 3) to communications with the handed off CSOs.

The responsive actions taken by task 72 may additionally include the communication of a message back to the neighbor node to inform the neighbor node of new channel assignments for the calls of the subscriber units 22 (see FIG. 1) being handed off. The neighbor node may then inform the terminating units of the new channel assignments and a scheduled time for handing off to the new node 12. Handing off is relevant to routing data packets for both the space region and physical node embodiments of the present invention because routing procedures, discussed below, compensate for the hand offs in delivering data packets to the nodes 12 which act as terminal nodes for calls.

Background procedure 60 performs a task 74 to determine whether a need exists for processing one or more neighbor service update messages. Neighbor service update messages convey LCID values of the calls for which the neighbor node serves as a new terminal node. The service update message may inform a node 12 of a neighbor's new acquisition of a channel or release of a previously active channel. Channels may be acquired when, for example, a call has been recently setup or terminated or a call has been handed off.

In either of the space region or physical node embodiments of the present invention, the neighbor service update messages convey link status data. The link status data characterize the ability of a neighbor node to process traffic data received over a common cross link 16 (see FIG. 2). The status data may indicate that a cross link 16 has failed, that the neighbor node is experiencing exceptionally heavy data traffic and has a reduced capability to process new data traffic, or that normal communication can take place. These status data are used in the present invention to prioritize data packet traffic over the corresponding cross link. Neighbor status update messages may be exchanged between neighbor nodes regularly.

When task 74 detects a need for processing one or more neighbor service update messages, a task 76 saves the contents of the messages in neighbor service map 56 (see FIG. 3). Task 76 may be performed immediately after task 74 or later in a separate process which has been queued by task 74. In the space region embodiment of the present invention, LCID values are preferably saved in a manner that allows them to be saved quickly yet accessed quickly at some future time given the LCID value. Node 12 additionally saves the status data in table 56. Of course, node 12 may detect that a cross link 16 (see FIG. 2) has failed on its own, without waiting to receive a neighbor service update message, and save this information in an appropriate status variable in table 56.

Background procedure 60 performs a task 78 to determine whether any calls have recently been initiated or terminated at node 12. When such a call status change is detected, node 12 performs a task 80, either immediately following task 78 or in a separate process queued by task 78. Task 80 formats and sends a neighbor service update message, discussed above. The update message is sent to all neighbor nodes to inform the neighbor nodes of the change in call status.

Background procedure 60 performs a task 82 to determine whether a need exists for handing off one or more ongoing calls to a neighbor node. The precise technique used to determine when to hand-off calls is not important to the present invention. Node 12 may, for example, base the hand-off decision on Doppler characteristics, timing concerns, signal strength, and the like. Those skilled in the art will appreciate that such factors may be used to suggest when the entity being communicated with, such as a subscriber unit 22 (see FIG. 1), has reached a threshold distance away from node 12 and is receding.

When task 82 determines that a hand-off is needed, a task 84, which may be performed immediately after task 82 or later in a separate process queued by task 82, is performed. Task 84 formats and sends a hand-off directive to the neighbor node receiving the handed off call. Following task 84, a task 86 may be performed to inform neighbor nodes of the change in call status resulting from the hand-off.

A tasks 88 is performed for the physical node embodiment but may be omitted for the space region embodiment. Task 88 formats and sends a new destination directive to the opposite terminus of the call being handed off. The new destination directive is sent to a node of network 10 that is controlling the opposite terminus of the call, such as a CSO 18, GCS 20, or another node 12 through which a subscriber unit 22 is directly communicating (see FIG. 1). This node of network 10 is the one that has originated the data packets for which node 12 has been the terminal node. The new destination directive instructs this termination node to alter the routing code it includes in data packets to identify the neighbor node receiving the handed off call. After this termination node receives and responds to the new destination directive, constellation 11 (see FIG. 1) will begin routing the call's data packets to the receiving neighbor node.

Node 12 receives such new destination directives with respect to data packets received directly from a subscriber unit 22 and transferred onto another node of constellation 11 (i.e. data packets entering constellation 11 from a subscriber unit 22). The new received routing code is stored at an appropriate location within routing code table 57 (see FIG. 3). The appropriate location may be determined by looking up the entry in table 57 that holds an LCID value included in the directive. After revising table 57, node 12 will append the new routing code on call data packets received from subscriber unit 22 before transmitting them onward within constellation 11. CSOs 18 and GCSs 20 may perform a similar procedure in response to the receipt of new destination directives. Accordingly, call data originating from a public switched telecommunications network or the like and being transmitted to constellation 11 through a CSO 18 or GCS 20 may track changes in routing codes.

After task 88, a task 90 saves the identity of the call and of the neighbor node receiving the call in neighbor service map 56 (see FIG. 3). By saving a record of the call hand-off, node 12 can route data packets to their correct terminal node after the hand-off occurs, even though the data packets may include a stale routing code.

As shown in FIG. 4, program control for Background procedure 60 continually repeats after performing selected ones of tasks 62–90. Thus, the contents of RLUT 54, LCID table 52, and neighbor service map 56 are kept current in the memory of node 12. Of course, those skilled in the art will appreciate that many of tasks 62–90 may be performed simultaneously or in a different order than indicated in FIG. 4. Moreover, those skilled in the art will appreciate that node 12 may perform additional tasks not related to routing in Background procedure 60.

Figure 5:
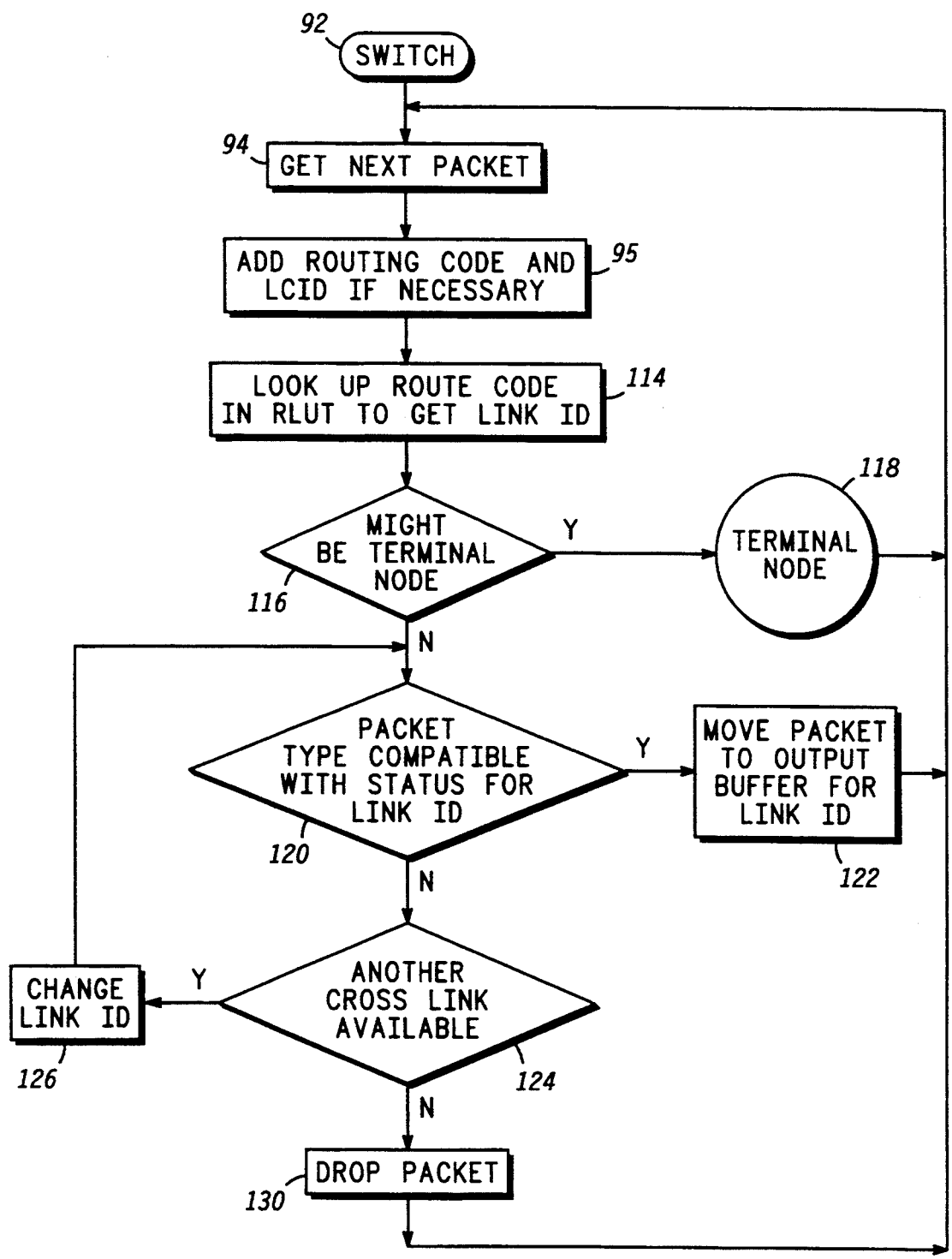
FIG. 5 shows a flow chart of a Switch procedure performed by switching nodes of the communication network.

FIG. 5 shows a flow chart of a Switch procedure 92 performed by a single node 12 in constellation 11 (see FIG. 1) to support the routing of communications. In the preferred embodiment of the present invention, all nodes 12 perform substantially the same procedure. A task 94 performed by procedure 92 obtains a data packet. The data packet may be obtained from any one of input buffers 44 (see FIG. 3). Procedure 94 may be performed multiple times simultaneously by multiple processors dedicated to serving their own input buffers 44 or by a single processor which serves all input buffers 44. Accordingly, the particular data packet obtained in task 94 is simply any data packet received at node 12 from any source, such as a neighbor node 12, a CSO 18 (see FIG. 1), a subscriber unit 22, or the like.

Data packets received from neighbor nodes 12, CSOs 18, or GCSs 20 (see FIG. 1) include a routing code and an LCID value. On the other hand, data packets received directly from subscriber units 22 (see FIG. 1) via input buffer 44 of multichannel transceiver 32 may not have such routing codes or LCID values. Accordingly, for such data packets a task 95 reads the address of the input buffer 44 of transceiver 32 from which a data packet has been obtained and accesses routing code table 57 using this address as a key. The routing code and LCID value stored in table 57 in association with this address is obtained and added or tagged to the received data packet. After task 95, all data packets include routing codes and LCID values.

The present invention accommodates the delivery of a variety of data packet formats through constellation 11. FIGS. 6 and 7 provide data format diagrams of two illustrative examples of data packets 96 delivered via constellation 11 (see FIG. 1). FIG. 6 illustrates two independent data packets 96, and FIG. 7 illustrates a single data packet 96. Both of the FIG. 6 and FIG. 7 embodiments of data packet 96 include a single header 98 and a single routing code 100 for each data packet 96. Header 98 carries data identifying a type characterization to be associated with data packet 96, a length to be associated with packet 96, and any other information conventionally included in data packet headers.

The type characterization may, for example, indicate that data packet 96 carries raw data or voice data. Those skilled in the art will appreciate that voice data and raw data may differ from one another in that voice data packets 96 may tolerate a lower degree of certainty in their delivery than raw data packets 96. In addition, the type characterization may be used to convey routing history data. Constellation 11 may then treat data packets 96 which have already experienced routing problems with a greater priority than packets 96 that have not yet experienced such problems.

Routing code 100 is a relative short code, for example 4–12 bits and preferably 7–8 bits. Constellation 11 uses routing code 100 to quickly deliver packet 96 to the terminal node for that packet 96. A data format diagram for routing code 100 is illustrated in FIG. 8. Routing code 100 preferably consists of two segments. A termination segment 101 identifies the terminal node of constellation 11. In the physical node embodiment of the present invention, segment 101 directly identifies the node 12 which is to serve as the terminal node. In the space region embodiment, segment 101 identifies a space region. A down-link type segment 103 identifies the type of channel to use for routing the data packet 96 down to the earth. For example, a data packet may be routed to a subscriber unit 22 (see FIG. 1) through multichannel transceiver 32 (see FIG. 3) or to a CSO 18 or GCS 20 (see FIG. 1) through an earth-link transceiver 30 (see FIG. 3). Those skilled in the art will appreciate that nodes 12 need not consult type segment 103 unless it first determines that it is a terminal node for the data packet 96.

With reference back to FIG. 6, in the FIG. 6 embodiment each data packet 96 also includes a single LCID value 102 and a single set of payload data 104. Each node 12 may serve as a terminal node for thousands of independent communications which need to be distributed among any number of termination units. Each independent communication is conveyed by any number, often in the thousands, of data packets 96, and each communication's data packets are received at the terminal node in a relatively arbitrary order. LCID value 102 identifies the specific termination unit to which the data packets 96 should be routed.

FIG. 9 illustrates an exemplary data format diagram of LCID value 102. As shown in FIG. 8, LCID value 102 may include a sequence number component 106 and a CSO ID component 108. CSO ID 108 uniquely identifies the CSO 18 (see FIG. 1) which created the LCID value 102 and which has a managing interest in the communication. Sequence number 106 identifies a particular call or registered subscriber unit 22 that is associated with that CSO 18. Each CSO 18 preferably insures that it activates no two identical sequence values at the same time. Accordingly, by taking CSO ID 108 with sequence number 106, LCID value 102 uniquely identifies a termination unit to which a data packet 96 is being sent.

With reference back to FIG. 6, header 98, routing code 100, and LCID value 102 together represent overhead data included in each packet 96. Generally speaking, data packets 96 are delivered through constellation 11 for some purpose other than the communication of the overhead data. The overhead data are included primarily for purposes of control. On the other hand, the communication of payload data 104 serves as the primary purpose for delivering packets 96 through constellation 11. Payload data 104 is not restricted in form and may represent digitized voice data, raw computer data, video data, and the like.

The FIG. 7 embodiment of data packet 96 differs from the FIG. 6 embodiment in that each packet 96 in the FIG. 7 embodiment may include any number of sub-packets 110. Each sub-packet 110 may include its own header 112 to characterize the length of the associated sub-packet 110. Each sub-packet 110 may include its own LCID value 102 and payload data 104. In accordance with the FIG. 7 embodiment, each data packet 96 may include multiple independent communications to be delivered to different termination units. Each of these multiple communications has its own LCID value 102 and payload data 104. However, all of these communications are associated with a common routing code 100. Nodes 12 in constellation 11 that are not terminal nodes process only a single routing code 100 to route multiple independent sub-packets 110.

With reference back to FIG. 5, after task 94 has obtained a packet 96 from an input buffer 44 (see FIG. 3) and task 95 has added a routing code and LCID value when needed, whether packet 96 is formatted in accordance with the FIG. 6 or FIG. 7 embodiment or otherwise, a task 114 performs a table look up operation on RLUT table 54 (see FIG. 3) using routing code 100 from packet 96 as a table index. Those skilled in the art will appreciate the speed with which a table look up operation may be performed. Thus, task 114 quickly obtains a link ID for the packet 96 obtained above in task 94.

After task 114, a query task 116 determines whether to route the packet 96 over a cross link 16 (see FIG. 2) or whether the node 12 performing task 116 might be the terminal node for the packet 96. If the node 12 is the terminal node, then the packet 96 will be routed down to the termination unit for whom the packet 96 is intended, either directly through transceiver 32 (see FIG. 3) or indirectly via a transceiver 30 and CSO 18 or GCS 20.

For the space region embodiment of the present invention, task 116 preferably evaluates the link ID obtained in task 114 in making its determination. On the other hand, for the physical node embodiment of the present invention, task 116 may evaluate routing code 100 itself. As will become apparent from the discussion below, task 116 cannot determine with certainty at this point that the node 12 performing task 116 is the terminal node for packet 96. If task 116 determines that node 12 might be the terminal node for data packet 96, program control proceeds to a Terminal Node procedure 118, discussed below in connection with FIG. 10.

When task 116 determines that the node 12 performing task 116 is not the terminal node, procedure 92 verifies the link ID obtained above in task 114, appropriately disposes of the packet 96, and then loops to process another packet 96. In particular, a query task 120 determines whether the packet type, included in header 98 of the packet 96 (see FIGS. 6–7), is compatible with the status of the link ID obtained above in task 114. The compatibility may be resolved by a comparison operation. The status of the link may be obtained from neighbor service map 56 (see FIG. 3). As discussed above in connection with Background procedure 60, this status indicates the quality of the cross link 16 (see FIG. 2) identified by the link ID, indicates the ability of the recipient neighbor node 12 to process the packet 96 due to traffic congestion, and is kept current by Background procedure 60. In the vast majority of cases, packet 96 will be compatible with the status of the cross link 16 indicated by the link ID.

When task 120 finds compatibility, a task 122 moves the packet 96 to the output buffer 46 associated with the transceiver 28 (see FIG. 3) indicated by the link ID. The packet 96 will automatically be transmitted to the corresponding neighbor node 12 in due course. After task 122, program control loops back to task 94 to begin processing another packet 96.

On the other hand, in some circumstances task 120 may discover an incompatibility. The incompatibility may result from a failure of a cross link 16, from excessive traffic congestion at the neighbor node 12, or the like. When an incompatibility is discovered, a query task 124 determines whether another cross link 16 is available. If, for example, each node 12 supports six cross links 16 (see FIG. 2) any one of four or five alternate cross links 16 may be utilized in disposing of a packet 96 when the preferred cross link choice indicated by the link ID from task 114 is not available. Procedure 92 loops to examine these alternate cross links 16, and task 124 determines whether to break the loop.

When another cross link 16 is available, a task 126 changes the link ID to one that corresponds to one of the alternate cross link choices. Task 126 may use a predetermined algorithm in selecting which of the remaining cross links 16 is preferred. For example, task 126 may select the cross link 16 immediately clockwise to the previously examined choice. Alternatively, RLUT 54 (see FIG. 3) may include a segment 128 which lists the alternate link IDs in a preferred order of priority. In addition, task 126 may desirably alter the type data included in header 98, if not previously altered in the loop, to indicate that the packet 96 is being re-routed.

After task 126, program control loops back to task 120 to test the compatibility of the selected alternate cross link 16. Program control remains in the loop of tasks 120, 124, and 126 until a compatible cross link 16 is found or until all cross links 16 have been examined and found to be incompatible. As soon as a compatible cross link 16 has been found, task 122 moves the packet 96 to the output buffer 46 (see FIG. 3) for that cross link. When no compatible link 16 is found, task 124 switches program control to a task 130. Task 130 drops the packet 96, and procedure 92 then loops back to task 94 to process another packet 96. By dropping the packet 96, the packet 96 will not be sent beyond node 12 and will not reach its intended destination. However, in dropping packet 96 task 130 may desirably keep statistics on the number of dropped packets 96. Preferably, the dropping of a packet 96 is an extremely rare occurrence and one which happens only in connection with lower priority data packet types.

Those skilled in the art will appreciate that the routing procedure discussed above in connection with procedure 92 compensates for link failures and for excessive data traffic congestion. When all nodes 12 in constellation 11 perform their own versions of procedure 92, data packets 96 are automatically re-routed as needed to compensate for link failures and congestion.

Figure 10:
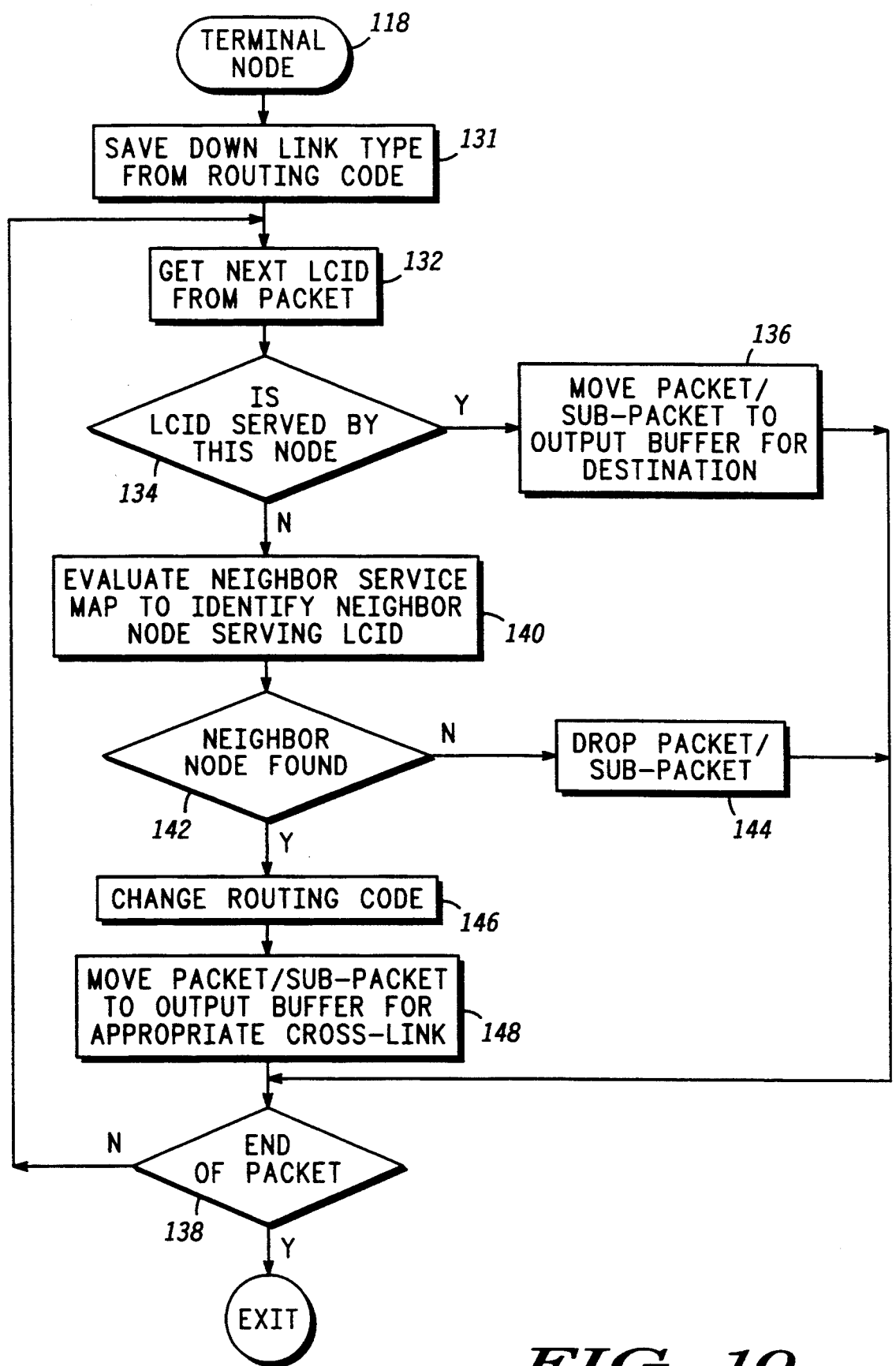
FIG. 10 shows a flow chart of a Terminal Node procedure performed by switching nodes of the communication network.

FIG. 10 shows a flow chart of Terminal Node procedure 118. As discussed above in connection with task 116 of procedure 92 (see FIG. 5), procedure 118 is performed when task 116 determines that the node 12 performing procedure 92 might be a terminal node for the data packet 96 currently being processed. Procedure 118 resolves whether the node 12 actually is the terminal node for the data packet 96 and appropriately disposes the packet 96, including any sub-packets 110 (see FIG. 7) therein.

Procedure 118 performs a task 131 to obtain and save the down-link type segment 103 of the routing code 100. The down-link type specifies whether packet 96 is intended for a subscriber unit 22, in which case it may be delivered through transceiver 32 (see FIG. 3), or a CSO 18 or GCS 20, in which case it may be delivered through one of transceivers 30 (see FIG. 3). After task 131, procedure 118 performs a task 132 to obtain an LCID value 102 (see FIGS. 6-8) from the packet 96. In connection with the FIG. 6 embodiment of packet 96, there is only one LCID value 102 to get. However, in the FIG. 7 embodiment of packet 96, each sub-packet 110 has its own LCID value 102, and task 132 obtains one of these LCID values 102.

After task 132, a query task 134 evaluates the LCID value 102 to determine whether the channel identified by this LCID value 102 is currently being served by the node 12 performing procedure 118. When the down-link type saved above in task 131 indicates that packet 96 is to be delivered to a subscriber unit 22, this evaluation may be performed by accessing LCID table 52 (see FIG. 3) to determine whether the LCID value 102 is listed therein. If the LCID value 102 is listed in table 52, then the channel identified by the LCID value 102 is being served by this node 12. In other words, this node 12 is the terminal node for the data packet 96 or sub-packet 110 with which the LCID value 102 is associated, and this node actually is the terminal node for the packet 96 or sub-packet 110. On the other hand, when the down-link type saved above in task 131 indicates delivery to a CSO 18 or GCS 20, task 134 need only examine the CSO ID portion 108 (see FIG. 9) of LCID value 102. If this node 12 is the terminal node for the data packet 96 or sub-packet 110, then portion 108 corresponds to one of transceivers 30 (see FIG. 3).

When the channel or link indicated by LCID value 102 is being served by this node 12, a task 136 moves the packet 96 or sub-packet 110 associated with the LCID value 102 to the appropriate output buffer 46 of a transceiver 30 or 32 (see FIG. 3). The packet 96 or sub-packet 110 will automatically be routed to the indicated destination in due course.

After task 136, a query task 138 determines whether the end of the packet 96 has been encountered. Task 138 is more pertinent to the FIG. 7 embodiment of packet 96 than the FIG. 6 embodiment because the FIG. 6 embodiment only permits one LCID value to be associated with each packet 96. Nevertheless, when the entire packet 96 has not yet been disposed of, as is possible in the FIG. 7 embodiment of packet 96, program control loops back to task 132 to process the next LCID value 102 from the packet 96. When the entire packet has been disposed of, program control exits procedure 118 from task 138 and returns to procedure 92 (see FIG. 5), where node 12 processes another packet 96.

When task 134 fails to determine that this node 12 is serving the channel or link indicated by the LCID value 102, a task 140 evaluates neighbor service map 54 (see FIG. 3) to identify which of the neighbor nodes is serving that LCID or CSO ID portion thereof. This node 12 might not be the serving node when a call has been handed off to a neighbor node and the termination unit sending data packets 96 has not yet responded to a new destination directive, as discussed above in connection with task 88 (see FIG. 4). Alternatively, in the space region embodiment of the present invention, several nodes 12 may serve a common space region 26 (see FIG. 2).

Preferably, task 140 accesses map 54 using LCID value 102 or CSO ID 108 as a key. By accessing map 54, task 140 quickly determines the identity of the neighbor node serving the LCID value 102. In connection with the space region embodiment of the present invention, neighbor service map 54 is kept current through the communication of neighbor service update messages, discussed above in connection with Background procedure 60 (see FIG. 4). In connection with the physical node embodiment of the present invention, neighbor service map 54 is kept current through the recording of hand-off data, as discussed above in connection with task 90 (see FIG. 4).

After task 140, a query task 142 determines whether a serving neighbor node was found. If no neighbor node serving the LCID value 102 has been found, a task 144 drops the packet 96 or sub-packet 110, and program control proceeds to task 138 to process the next sub-packet 110 or packet 96. In dropping the packet 96 or sub-packet 110, task 144 may advantageously maintain statistics on dropped packets 96 and sub-packets 110.

When task 142 determines that a serving neighbor node has been found, a task 146 alters the routing code to indicate this neighbor node. Task 146 is optional for the space region embodiment of the present invention because the neighbor node presumably shares service of a common space region 26 (see FIG. 2) with the node 12 performing procedure 118. On the other hand, in the physical node embodiment of the present invention, task 146 will cause the neighbor node no determine that it might be the terminal node for the data packet 96 or sub-packet 110.

After task 146, a task 148 moves the packet 96 or sub-packet 110 to the output buffer 46 associated with the cross link 16 (see FIG. 2) to the indicated serving neighbor node. Task 148 may advantageously re-format a sub-packet 110 into a packet 96 prior to placing it in the output buffer 46. The packet 96 will automatically be sent to the appropriate neighbor node in due course.

After task 148, program control proceeds to task 138 to process the next sub-packet 110 or packet 96.

In summary, the present invention dynamically routes communication signals. The dynamic nature of the present invention allows physical nodes through which communication signals are routed to change during the course of a call. A minimal amount of network resources are dedicated to routing communication signals. A relatively small routing code is included in each data packet being delivered through the constellation of nodes, and routing is performed, at least in part, based upon a table look up operation that utilizes only a relatively small amount of memory. Moreover, the present invention distributes routing decisions among network nodes. Consequently, it instantly and automatically responds to data traffic congestion and link failures, and automatically corrects for incorrect routing decisions. Furthermore, the present invention disposes of data packets quickly to minimize delay in delivering communication signals between network entry and exit points.

The present invention has been described above with reference to preferred embodiments. However, those skilled in the art will recognize that changes and modifications may be made in these preferred embodiments without departing from the scope of the present invention. For example, those skilled in the art will appreciate that the particular tasks discussed herein may be sequenced differently than described. Moreover, the precise timing, orbital geometry, network topology, data code lengths, and other parameters discussed herein are presented as illustrative examples and are not to be viewed as limiting the scope of the present invention. These and other changes and modifications which are obvious to those skilled in the art are intended to be included within the scope of the present invention.

What is claimed is:

1. A method of routing a signal through a switch which serves as one node in a constellation of switching nodes that move with respect to each other, said switch having a plurality of communication links associated therewith and having a neighbor node associated with each of said communication links, said method comprising the steps of:
receiving neighbor service update messages at said switch indicating if any of said communication links have failed or if one of said neighbor nodes cannot process traffic data;
receiving, at said switch, a data packet having a routing code therein, said data packet representing at least a portion of said signal;
obtaining a link identifier in response to said routing code, said link identifier specifying a first choice communication link for routing said data packet away from said switch based on said routing code;
determining a link status from said neighbor service update messages for said first choice communication link, said link status indicating if said first choice communication link has failed or if said neighbor node associated with said first choice communication link can process said data packet;
dynamically determining by said switch using said link identifier and said link status, one of said communication links for routing said data packet away from said switch; and
transmitting said data packet away from said switch over said one communication link.

2. A method as claimed in claim 1 wherein said obtaining step comprises the step of looking up said routing code in a routing look up table to obtain said link identifier wherein said routing code identifies a space region to which said data packet is directed, said space region being associated with a destination of said data packet.

3. A method as claimed in claim 2 wherein said constellation is comprised of switching nodes dispersed around the earth and delivers said signal between two points having a relative movement with respect to said switch, and said method additionally comprises the steps of:
generating new routing look up tables from time to time, to compensate for said relative movement of said two points with respect to said switch; and
switching operation of said looking up step between a currently used look up table and a new look up table in accordance with a schedule.

4. A method as claimed in claim 1 additionally comprising, after said obtaining step, the step of evaluating said link identifier to determine whether said switch is a terminal node for said data packet, said terminal node being a constellation node which routes said data packet out of said constellation.

5. A method as claimed in claim 4 wherein said data packet additionally includes a logical channel identification (LCID) value therein and said evaluating step comprises the step of evaluating said LCID value to confirm whether a channel identified by said LCID value is served by said switch.

6. A method as claimed in claim 5 wherein said method additionally comprises the steps of:
maintaining a list of channels served by neighbor nodes of said constellation of nodes; and
selecting, when said switch is not a terminal node for said data packet, one neighbor node for receipt of said data packet, said one neighbor node being selected in response to said list and said LCID value.

7. A method as claimed in claim 4 wherein said method additionally comprises the steps of:
maintaining a list describing a capacity status of a current traffic carrying capacity of each of said plurality of communication links; and
consulting said list to verify that said data packet is compatible with said capacity status for said one communication link, said consulting step being performed prior to said transmitting step when said evaluating step determines that said switch is not said terminal node for said data packet.

8. A method as claimed in claim 7 wherein said consulting step comprises the step of altering, when said data packet is not compatible with said capacity status, said link identifier so that another of said plurality of communication links is specified and so that said data packet is compatible with said capacity status from said list for said another communication link.

9. A method as claimed in claim 1 wherein said dynamically determining step comprises the step of dynamically determining said one communication link where said one communication link is said first choice communication link when said link status indicates that said first choice communication link has not failed and said neighbor node associated with said first choice link can process said data packet, said one communication link being a second choice communication link when said link status indicates that said first choice communication link has failed or when said neighbor node associated with said first choice link cannot process said data packet.

10. A method as claimed in claim 9 further comprising the step of dynamically determining if said second choice communication link has failed and if the neighbor node associated with said second choice communication link cannot process said data packet when said link status indicates that said first choice communication link has failed or said neighbor node associated with said first choice communication link cannot process said data packet.

11. A method as claimed in claim 1 wherein each of said neighbor nodes is associated with a plurality of neighbor node communication links, and in said receiving step, said neighbor service update messages indicate if one of said neighbor node communication links has failed.

12. A method as claimed in claim 1 further comprising the step of exchanging with said neighbor nodes, neighbor service update messages which indicate said link status of said communication links, said exchanging step being performed on a regular basis as said nodes change their relative position.

13. A method of routing a signal through a constellation of switching nodes dispersed around the earth, said signal being delivered between two points that have relative movement with respect to said constellation, and said method comprising the steps of:
receiving a data packet at a first node of said constellation, said data packet having a routing code and a logical channel identification (LCID) value therein, and said data packet representing at least a portion of said signal;
sending said data packet to a second node of said constellation, said second node being identified in response to said routing code;
evaluating said LCID value to determine whether a logical channel identified by said LCID value is served by said second node;
dynamically determining, when said second node does not serve said logical channel, a second communication link for transmission of said data packet to a third node, said dynamic determination based on a link status associated with said second communication link, said link status indicating if said second communication link has failed or if said third node associated with said second communication link can process said data packet; and
transmitting, when said second node does not serve said LCID value, said data packet away from said second node toward said third node over said second communication link determined in response to said LCID value when said link status indicates that said second communication link has not failed and that said third node is able to process said data packet.

14. A method as claimed in claim 13 additionally comprising, prior to said sending step, the step of obtaining a link identifier in response to said routing code, said link identifier specifying one of a plurality of communication links for sending said data packet away from said first node.

15. A method as claimed in claim 14 wherein said obtaining step comprises the step of looking up said routing code in a routing look up table to obtain said link identifier.

16. A method as claimed in claim 15 wherein said method additionally comprises the steps of:
generating new routing look up tables from time to time, said new routing look up tables compensating for said relative movement of said two points with respect to said constellation; and
switching operation of said looking up step between a currently used look up table and a new look up table in accordance with a predetermined schedule.

17. A method as claimed in claim 14 wherein said method additionally comprises the steps of:
maintaining, at said first node, a list describing a capacity status of the current traffic carrying capacity of each of said plurality of communication links; and
consulting said list to verify that said data packet is compatible with said capacity status for said one communication link.

18. A method as claimed in claim 14 wherein said consulting step comprises the step of altering, when said data packet is not compatible with said capacity status, said link identifier so that another of said plurality of communication links is specified and so that said data packet is compatible with said capacity status from said list for said another communication link.

19. A method as claimed in claim 13 wherein:
said method additionally comprises the step of maintaining, at said second node, a list of logical channels served by neighbor nodes to said second node; and
said transmitting step additionally determines said second communication link in response to said list.

20. A method as claimed in claim 13 additionally comprising, prior to said receiving step, the steps of:
receiving said data packet at a fourth node of said constellation;
adding said routing code to said data packet; and
sending said data packet to said first node from said fourth node, said first node being identified in response to said routing code.

21. A method as claimed in claim 20 wherein said data packet is received through one of a plurality of channels at said fourth node from outside said constellation, and said method additionally comprises the steps of identifying said one channel, and obtaining said routing code in response to said identified one channel.

22. A data packet switching node for routing a signal within a constellation of switching nodes dispersed around the earth, said switching node having a plurality of communication links associated therewith and having a neighbor node associated with each of said communication links, said switching node comprising:
a first receiver configured to receive a data packet having a routing code therein, said data packet representing at least a portion of said signal;
a second receiver configured to receive neighbor service update messages at said switching node indicating if any of said communication links has failed or if any of said neighbor nodes cannot process traffic data;
means, coupled to said first receiver, for obtaining a link identifier in response to said routing code, said link identifier specifying a first choice communication link for routing said data packet away from said switching node;
means for dynamically determining a link status from said neighbor service update messages for said first choice communication link, said link status indicating if said first choice communication link has failed or if said neighbor node associated with said first choice communication link can receive said data packet;

means for dynamically evaluating said link status to determine if said neighbor node associated with said first choice communication link specified by said link identifier has not failed and is able to receive said data packet; and a transmitter, coupled to said means for obtaining, for transmitting said data packet away from said switching node over said first choice communication link.

23. A data packet switching node as claimed in claim 22 wherein said means for obtaining comprises a memory, said memory being configured as a look up table in which said routing code is looked up to obtain said link identifier.

24. A data packet switching node as claimed in claim 23 additionally comprising means, coupled to said means for obtaining, for determining whether said switching node is a terminal node for said data packet, said terminal node being a constellation node which routes said data packet out of said constellation.

25. A data packet switching node as claimed in claim 24 wherein:

said data packet additionally includes a logical channel identification (LCID) value therein;

said determining means comprises means for evaluating said LCID value to verify that a channel identified by said LCID value is actually served by said switching node;

said switching node additionally comprises a memory structure configured as a list of channels served by neighbor nodes to said switching node; and said switching node additionally comprises means, coupled to said determining means and to said memory structure, for selecting said neighbor node for receipt of said data packet when said LCID value is not served by said switching node.

26. A switching node as claimed in claim 22 further comprising means for dynamically determining a second choice communication link when said link status indicates that said first choice communication link has failed or when said neighbor node associated with said first choice link cannot receive said data packet.

27. A method of routing a data packet through a node of a plurality of nodes comprised of low earth orbit satellites linked together with cross links, said method comprising the steps of:

receiving said data packet at said node, said data packet having a routing code specified therein, said routing code including a destination node code indicating the destination of said data packet;

using said routing code to determine a preferred cross link for routing said data packet to a preferred neighbor node, said preferred cross link having an associated link status which includes whether said preferred cross link has failed and the ability of said preferred neighbor node to accept said data packet;

evaluating said associated link status of said preferred cross link to determine if said preferred cross link has failed;

evaluating said associated link status of said preferred cross link to determine if said preferred neighbor node can accept said data packet; and determining an alternative cross link to route said data packet when said associated link status indicates that said preferred cross link has failed or said preferred neighbor node cannot accept said data packet; and transmitting said data packet on said alternative cross link to an alternative neighbor node associated with said alternative cross link.

* * * * *

UNITED STATES PATENT AND TRADEMARK OFFICE
CERTIFICATE OF CORRECTION

PATENT NO. :  5,365,520

DATED      :  November 15, 1994

INVENTOR(S) :  Teresa C. Y. Wang and Raymond J. Leopold

It is certified that error appears in the above-identified patent and that said Letters Patent is hereby corrected as shown below:

In Claim 18, column 20, line 19, delete "14" insert --17--.

Signed and Sealed this

Twenty-eight Day of March, 1995

Attest:

BRUCE LEHMAN

Attesting Officer       Commissioner of Patents and Trademarks